(12) United States Patent
Im

(10) Patent No.: US 7,392,072 B2
(45) Date of Patent: Jun. 24, 2008

(54) CAMERA LENS MODULE AND PORTABLE WIRELESS TERMINAL HAVING THE SAME

(75) Inventor: Jin-Man Im, Seoul (KR)

(73) Assignee: Samsung Electronics Co., Ltd. (KR)

( * ) Notice: Subject to any disclaimer, the term of this patent is extended or adjusted under 35 U.S.C. 154(b) by 314 days.

(21) Appl. No.: 10/612,801

(22) Filed: Jul. 2, 2003

(65) Prior Publication Data
US 2004/0009790 A1    Jan. 15, 2004

(30) Foreign Application Priority Data
Jul. 10, 2002    (KR) ...................... 10-2002-0039960

(51) Int. Cl.
*H04N 7/14* (2006.01)
(52) U.S. Cl. ................ 455/575.3; 379/433.13
(58) Field of Classification Search ............ 455/575.3, 455/90.3; 379/433.13
See application file for complete search history.

(56) References Cited

U.S. PATENT DOCUMENTS

| | | | |
|---|---|---|---|
| 5,491,507 A * | 2/1996 | Umezawa et al. ........ 348/14.02 |
| 6,708,046 B1 | 3/2004 | Takagi | |
| 6,785,935 B2 * | 9/2004 | Ahn et al. ...................... 16/221 |
| 6,879,337 B2 * | 4/2005 | Tatehana et al. ......... 348/14.02 |
| 2001/0036845 A1 * | 11/2001 | Park ........................... 455/566 |
| 2002/0187818 A1 * | 12/2002 | Kang .......................... 455/575 |

FOREIGN PATENT DOCUMENTS

| | | |
|---|---|---|
| JP | 2001-165144 | 6/2001 |
| JP | 2001-298516 | 10/2001 |

* cited by examiner

*Primary Examiner*—Edward F. Urban
*Assistant Examiner*—Adeel Haroon
(74) *Attorney, Agent, or Firm*—The Farrell Law Firm, P.C (57) ABSTRACT

Disclosed is a camera lens module which is mounted on a portable wireless terminal. The camera lens module is rotatably mounted on the hinged part of the terminal. The camera lens module makes it possible to photograph in various angles without largely varying the position or angle of the terminal, because the camera lens module is constructed to be rotatable in relation to the terminal without any inconvenience whereby the user must separately assemble or disassemble the camera lens module. In addition, such a construction makes it easy to secure a space for mounting the camera lens module, because the camera module is mounted by means of the hinged part of the terminal.

23 Claims, 10 Drawing Sheets

CAMERA LENS MODULE AND PORTABLE WIRELESS TERMINAL HAVING THE SAME

PRIORITY

This application claims priority to an application entitled "Camera Lens Module and Portable Wireless Terminal Having the Same" filed with the Korean Industrial Property Office on Jul. 10, 2002 and assigned Serial No. 2002-39960, the contents of which are hereby incorporated by reference.

BACKGROUND OF THE INVENTION

1. Field of the Invention

The present invention relates to a portable wireless terminal, and more particularly to a camera lens module mounted on a portable wireless terminal and a portable wireless terminal having the same.

2. Description of the Related Art

Due to the development of the information and communication technology industry, various types of portable wireless terminals having various functions are coming into the market. Such terminals typically include a common bar type terminal, a flip type terminal provided with a flip cover, a folder type terminal with a folder which is mounted to be capable of being closed and opened to a predetermined angle on the main body of the terminal, and so forth.

Said terminals are additionally provided with various functions, for example, e-mail reception and transmission, Internet games, character transmission, and so forth, beyond the basic functions for sound transmission and reception. Recently, as novel modes of communication technology such as CDMA 1x EVDO have been introduced, the services available are increasingly extended to inter-user image communication between terminals, moving image service, etc.

As a result, the terminals are additionally provided with various key buttons, a camera lens, etc., in order to perform the above-described functions.

In particular, as the image communication and moving image service using portable wireless terminals have been extended, a camera lens gradually has become an essential component of a portable wireless terminal.

However, due to the tendency toward miniaturizing and lightening portable wireless terminals, it is difficult to secure a space for mounting a camera lens in wireless terminals. Furthermore, because the lens has been mounted on a side of a display or a top surface of the body, and has been directed toward a specific direction, there is inconvenience in that it is necessary to change the direction of the terminal in order to photograph objects positioned at various angles. Also, there exists a camera lens which can be removably attached to a portable wireless terminal using a ear-microphone jack or the like. However, such a camera lens is troublesome in that its user is required to separately carry and attach it to the terminal as needed.

SUMMARY OF THE INVENTION

Accordingly, the present invention has been made to solve the above-mentioned problems occurring in the prior art, and the object of the present invention is to provide a camera lens module for a portable wireless terminal which renders it easy to photograph from various angles while securing a space for mounting a camera lens.

In order to accomplish the aforementioned object, in accordance with the present invention, there is provided a camera lens module for a portable wireless terminal which comprises a camera unit consisting of a camera lens and a flexible printed circuit which provides an electrical connection means for the camera lens; a front cover comprising one or more ribs which form a lens receiving recess within which the camera lens is received, and an opening portion for exposure of the camera lens; a housing, one end of which is connected with the front cover to protect the camera lens received within the front cover and which is provided with a partition in a predetermined internal position, wherein the partition exposes the lens receiving recess of the front cover and a through-hole is formed in the partition to provide a passage for allowing the flexible printed circuit of the camera unit to be passed; a rear cover comprising a first flange which is connected to the other side of the housing and closes the through-hole of the housing, and a male hinge member which extends from the first flange and provides a connecting means to be rotatably connected to the portable wireless terminal, wherein a slit is formed in the longitudinal direction of the male hinge member from the first flange, so that the slit provides a passage for allowing the flexible printed circuit to be laterally extended; a female hinge member comprising a cylinder which receives the male hinge member of the rear cover in such a manner a tip end of the male hinge member can protrude out of the cylinder, and a second flange which is diametrically extended from one side of the cylinder and connected to the first flange of the rear cover, wherein a slit which corresponds to the slit of the rear cover is formed in the female hinge member to be extended in the longitudinal direction of the female hinge member from the second flange; and an elastic means which is mounted between the first flange and the second flange for providing elastic force for the female hinge member in the longitudinal direction of the female hinge member.

In addition, the present invention provides a portable wireless terminal comprising a main body and a folder rotatably hinged to the main body, wherein the portable wireless terminal further comprises a camera lens module which is rotatably connected to a module receiving portion formed in a side of a top end of the main body, the camera lens module comprising: a lens assembly comprising, in combination, a front cover within which a camera lens is received, and a cylindrical housing, one end of which is connected to the front cover to protect the camera lens received within the front cover and through which a flexible printed circuit of the said camera lens is drawn out; a rear cover comprising a first flange connected to the other end of the housing, and a male hinge member which extends from the first flange and provides a connecting means for allowing the camera module to be rotatably connected to the module receiving portion in the main body; a female hinge member comprising a cylinder which receives the male hinge member of the rear cover in such a manner that the tip end of the male hinge member can protrude out of the cylinder, and a second flange which is diametrically extended from one side of the cylinder and connected to the first flange of the rear cover; and a hinge assembly combined with an elastic means which is mounted between the first flange and the second flange for providing elastic force for the female hinge member in the longitudinal direction of the female hinge member.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described in detail with reference to the accompanying drawings. In the following description of the present invention, a detailed description of known functions and configurations incorporated herein is omitted to avoid making the subject matter of the present invention unclear.

Figure 1:
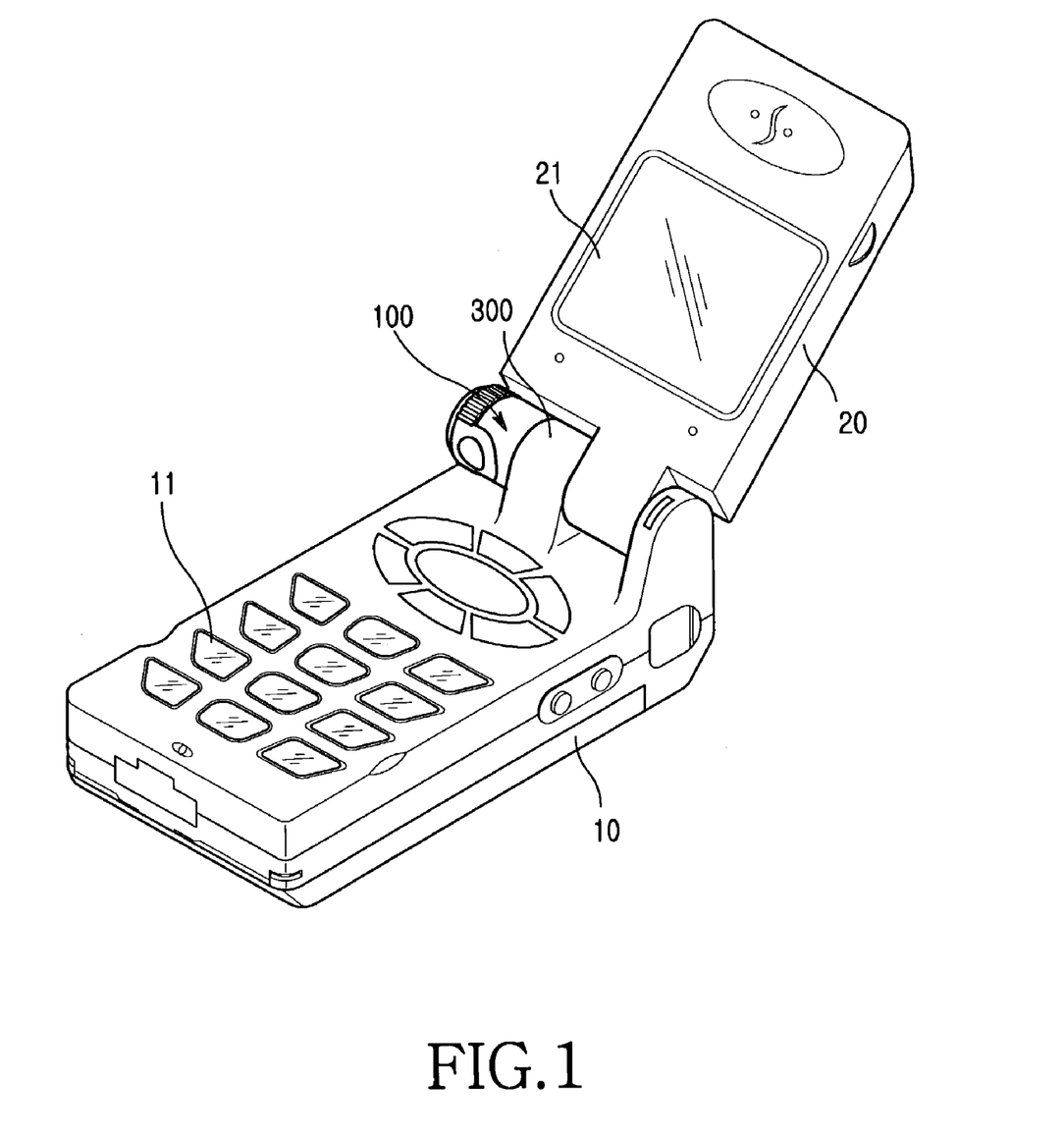
FIG. 1 is a perspective view showing a portable wireless terminal provided with a camera lens module in accordance with the present invention.

FIG. 1 is a perspective view showing a portable wireless terminal provided with a camera lens module 100. As shown in FIG. 1, the camera lens module 100 may be mounted on the hinged part of a folder type terminal. The folder type terminal comprises a main body 10, which is provided with a plurality of keys forming a key pad 11, a transmitting part and etc., and a folder 20 which is rotatably connected to the main body 10 and provided with a display 21.

Figure 2:
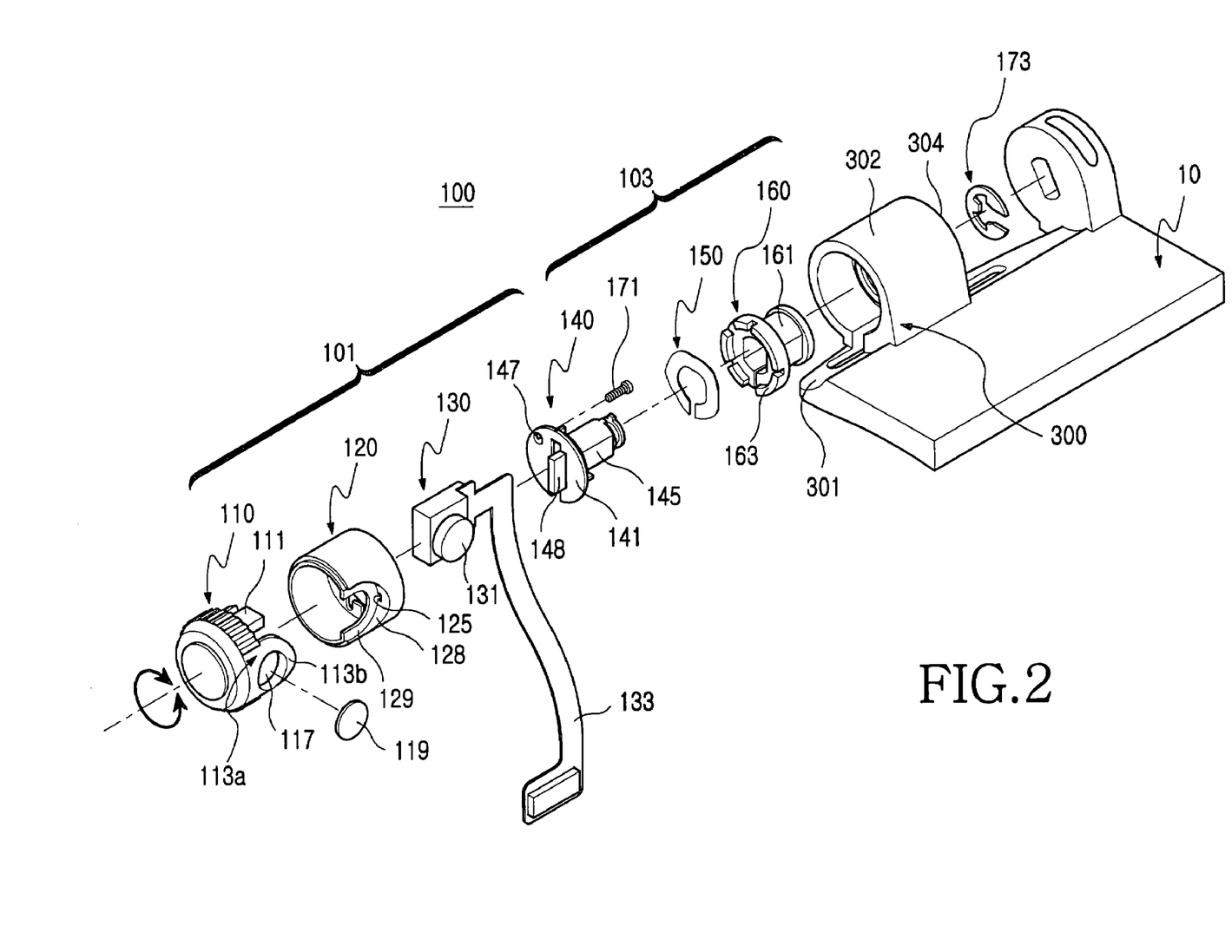
FIG. 2 is an exploded perspective view showing a camera lens module of a portable wireless terminal in accordance with a first preferred embodiment of the present invention.
Figure 3:
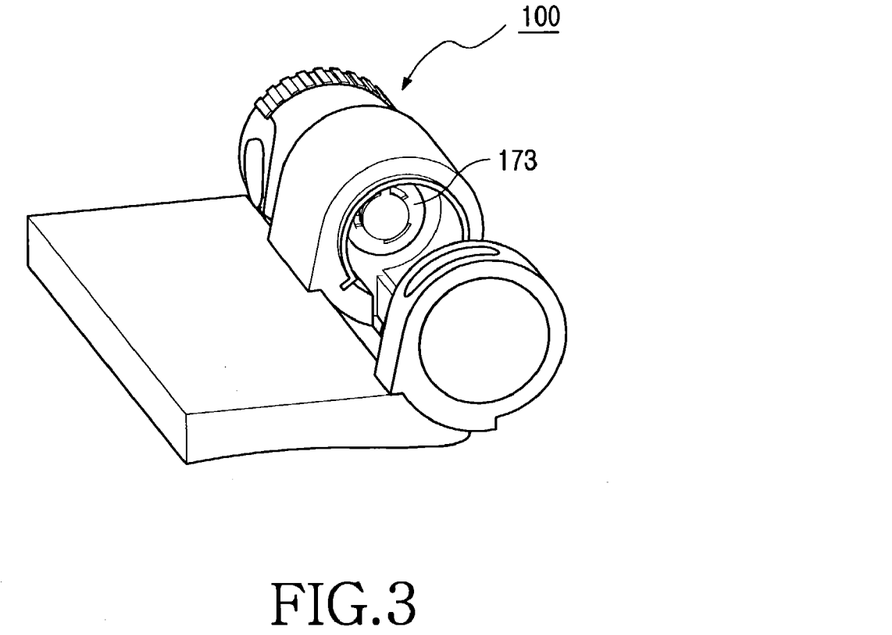
FIG. 3 is a perspective view showing the camera lens module shown in FIG. 2, which is connected to a portable wireless terminal.

FIG. 2 is an exploded perspective view showing the camera lens module 100 of a portable wireless terminal in accordance with the first preferred embodiment of the present invention, and FIG. 3 is a perspective view showing the camera lens module 100 which is connected to the portable wireless terminal. As shown in FIGS. 2 and 3, the camera lens module 100 of the portable wireless terminal in accordance with the first preferred embodiment of the present invention comprises a camera lens 131, which is received within a housing 120 and front and rear covers 110, 140 and which are rotatably connected to a module receiving portion 300 in the main body of the terminal via the rear cover 140 and a female hinge member 160.

Figure 12:
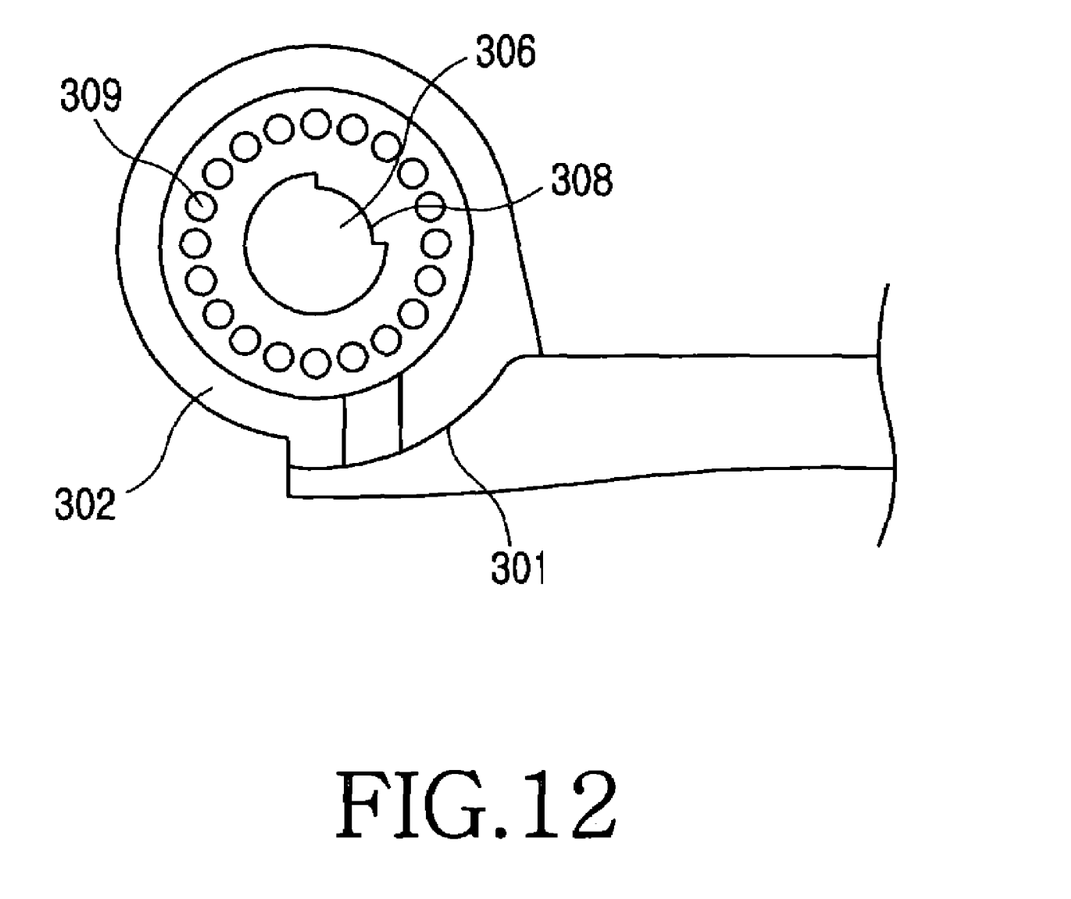
FIG. 12 is a side view showing a module receiving portion of the portable wireless terminal.

The module receiving portion 300 may be divided into a lens receiving portion 301 and a hinge receiving portion 302. The lens receiving portion 301 is formed at a side of a top end of the main body in a curved shape, and a lens assembly 101 of the camera lens module 100 is positioned in the lens receiving portion 301. The hinge receiving portion 302 is formed in a cylindrical shape which has an opened end in a side adjacent to the lens receiving portion 301 and a closed end 304 on the other side. For purposes of appearance, it is preferable to align the external circumferential surfaces of the lens assembly 101 and the hinge receiving portion 302 with each other when the camera lens module 100 has been assembled. Meanwhile, a through-hole 306 (as shown in FIG. 12) is formed in the closed end 304 of the hinge receiving portion 302, through which a tip end of a hinge assembly 103 protrudes, so that the through-hole 306 provides a connecting means for said camera lens module 100.

Figure 4:
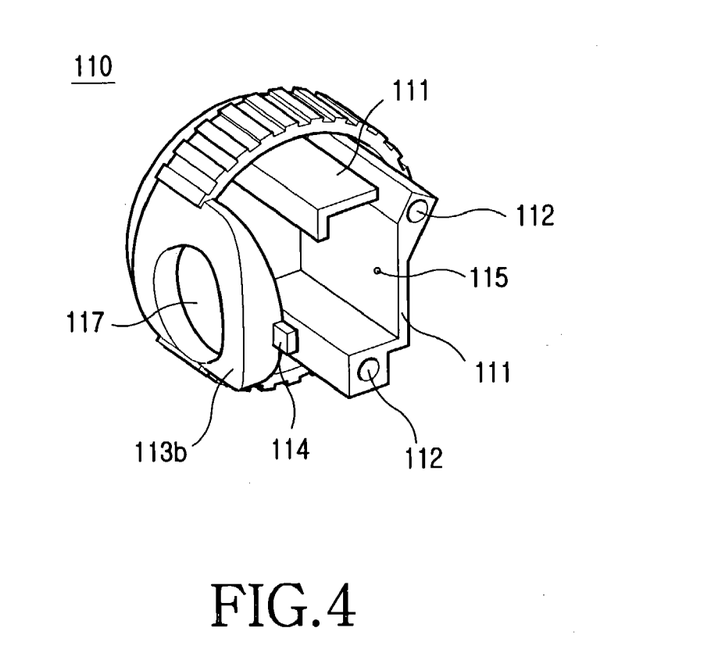
FIG. 4 is a perspective view showing a front cover of the camera lens module shown in FIG. 2.

Referring to FIGS. 2 and 4, ribs 111 are extended from a side of a front cover 110, thereby forming a recess for receiving the camera lens 131. The ribs 111, which form a lens containing recess 115, are bent to such an extent that they can position the camera lens 131 while supporting bottom and opposite lateral sides of the camera lens 131, and thus the ribs 111 restrain the top side of the camera lens 131. In addition, the front cover 110 has an exposure opening portion 113a. The exposure opening portion 113a consists of a lens cover 113b which extends from the external circumferential surface of the front cover 110 parallel to the ribs, and an opening 117 formed in the lens cover 113b. The camera lens 131 is exposed through the opening 117. The opening 117 is covered by a transparent window 119 so as to shut off interconnection between internal and external sides, so that the camera lens 131 can be protected. Meanwhile, the ribs 111 are provided with one or more screw holes 112. Preferably, the number of the screw holes is determined in consideration of connecting force and manner of assembling the camera lens module. The present embodiment is provided with two screw holes.

Figure 5:
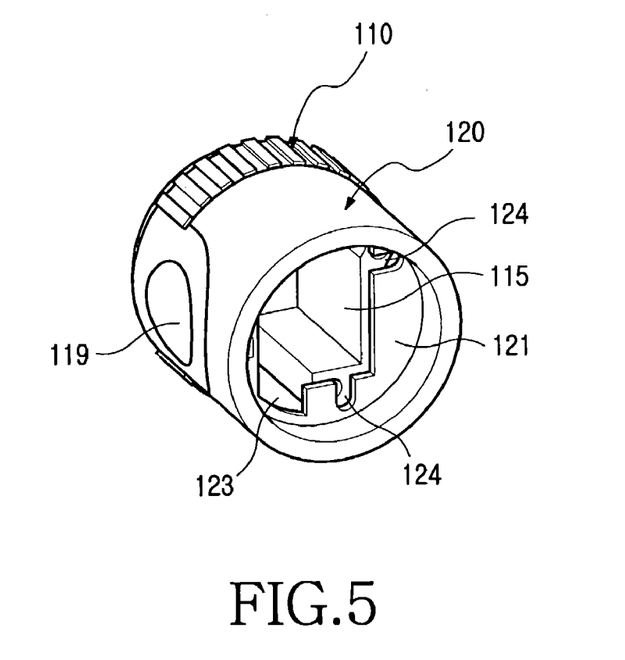
FIG. 5 is a perspective view showing the front cover and a housing of the camera lens module shown in FIG. 2 in the assembled state.

The housing 120 is open at its opposite ends and its internal space is divided into two parts by a partition 121 (see FIG. 5). The front cover 110 is connected to one end of the housing, so that the ribs 111 of the front cover 110 will abut against the partition 121 of the housing 120. The partition 121 of the housing 120 is provided with a through-hole 123 for exposing the lens containing recess 115 of the front cover 110.

The camera lens 131 is fitted into the lens containing recess 115 through the through-hole 123 and is protected by the housing 120, and a flexible printed circuit 133, which provides an electric connection means of the camera lens 131, is drawn out through the through-hole 123. In addition, the housing 120 is formed with a recess 128 on its circumference surface (see FIG. 2), which corresponds to the exposure opening portion 113a in shape, thereby providing a space for receiving the exposure opening portion 113a and a supporting die 126 (not shown) for supporting the window 119 which is installed in the opening 117. Furthermore, a projection 114 is formed at the end of the exposure opening portion 113a and a hole 125, which corresponds to the projection 114, is formed in the recess 128, thus providing a stable connection between the front cover 110 and the housing 120. Meanwhile, the partition 121 of the housing is formed with connecting holes 124 which correspond to the screw holes 112.

The partition 121 of the housing 120 is positioned within the housing 120 inwardly spaced from the other end of the housing 120, thus providing a space for connecting the rear cover 140.

FIG. 5 is a perspective view showing the front cover 110 and the housing 120 in the assembled state. As shown in FIG. 5, if the front cover 110 and the housing 120 are assembled with each other, the exposure opening portion 113a of the front cover 110 is fitted into the recess 128 formed on the external circumferential surface of the housing 120 and the lens containing recess 115 is exposed through the through-hole 123 formed in the partition 121 inside of the housing 120. Therefore, the camera lens 131 can be fitted into the lens containing recess 115 of the front cover 110 through the through-hole 123 as explained above.

Figure 6:
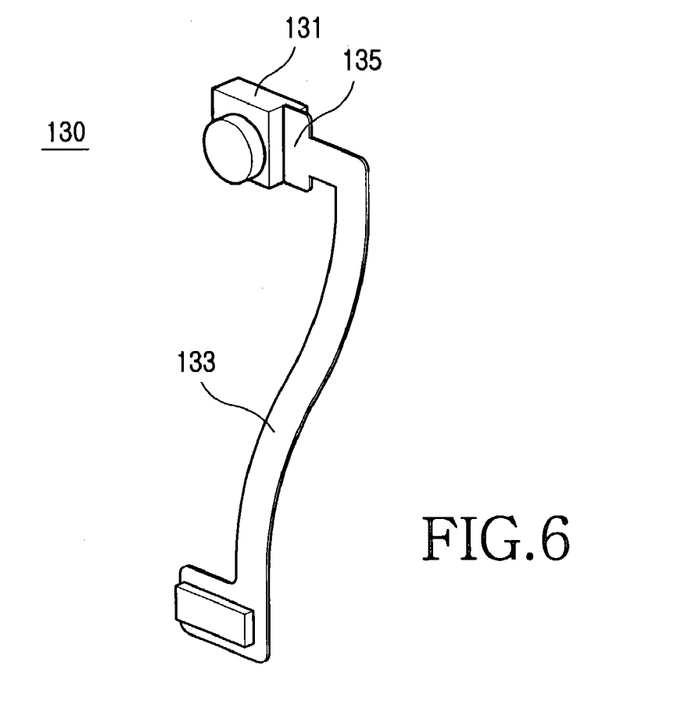
FIG. 6 is a perspective view showing a camera unit of the camera lens module shown in FIG. 2.

FIG. 6 is a perspective view showing a camera unit 130 of the camera lens module 100 shown in FIG. 2. As shown in FIG. 2, the camera unit 130 comprises the camera lens 131 and the flexible printed circuit 133, one end of which is connected to the camera lens 131. The flexible printed circuit 133 is laterally drawn from the camera lens 131, turned to a 90° direction and then connected to a main board (not shown) in the main body.

Figure 7:
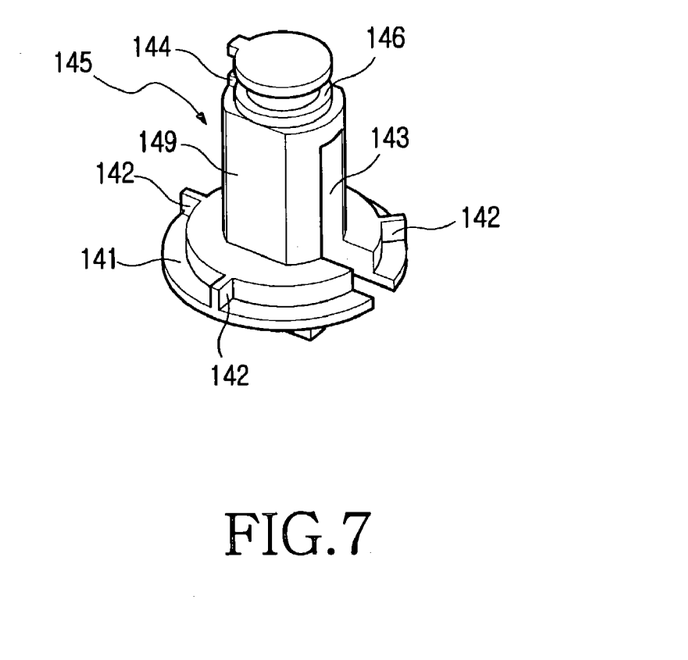
FIG. 7 is a perspective view showing a rear cover of the camera lens module shown in FIG. 2.

FIG. 7 is a perspective view showing the rear cover 140 of the camera lens module 100 shown in FIG. 2. As shown in FIGS. 2 and 7, the rear cover 140 comprises a first flange 141 and a male hinge member 145. The first flange 141 has through-hole(s) 147 which correspond to the screw hole(s) 112 in the front cover 110 and the connecting hole(s) 124 in the housing 120. Therefore, the front cover 110, the housing 120 and the rear cover 140 are connected with each other by linearly arranging the screw hole(s) 112, the connecting hole(s) 124 and the through-hole 147 and then fitting one or more screws into them.

From one side of the first flange 141, a fixed supporting die 148 protrudes to fix the camera lens 131 positioned within the lens containing recess 115 of the front cover 110. The fixed supporting die 148 supports one side 135 of the camera lens 131 which is positioned within the lens containing recess 115 (see FIG. 5), thus preventing the camera lens 131 from being moved.

The male hinge member 145 is extended from the other side of the first flange 141. A connecting groove 146 is formed in the circumferential direction on a portion of an outer surface near the tip end of the male hinge member 145, which is located away from the first flange 141. As shown in FIG. 3, the tip end of the male hinge member 145 protrudes through the through-hole 306 formed in the closed end 304 of the module receiving portion 300 and an E-ring 173 is fitted into the connecting groove 146 on the protruding end. As a result, the camera lens module 100 is connected to the module receiving portion 300 and the male hinge member 145 provides a rotational axis for the camera lens module 100. In addition, a projection 144 is formed on the circumferential surface of the tip end of the male hinge member 145 and a stopper 308 (not shown in FIG. 3) is provided in the inside of the through-hole 306 of the module receiving portion 300, thereby limiting the rotating range of the male hinge member 145.

It is possible to construct the male hinge member to be rotatable through a full 360° without any limit. However, it is preferable to limit the rotating range of the male hinge member 145 in order to avoid damage in the final product, because the length of the internal flexible printed circuit 133 is limited. This will be described further in detail with reference to the second preferred embodiment of the present invention.

Meanwhile, a slit 143 is longitudinally formed on the male hinge member 145 of the rear cover 140 from the first flange 141. The slit 143 provides a passage for laterally drawing out the flexible printed circuit 133 of the camera unit 130 assembled to the lens assembly 101. Flat surfaces 149 are formed between the tip end of the male hinge member 145 and the first flange 141. This is to prevent a female hinge member 160, to be explained below, from being moved after assembly.

Figure 8:
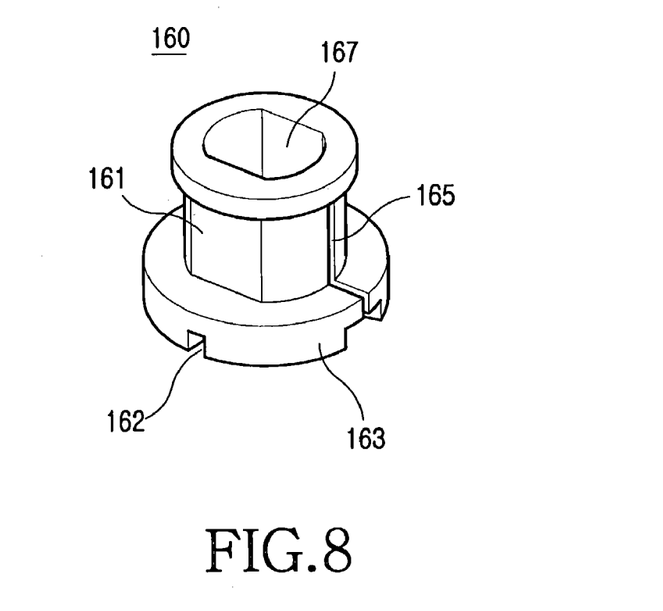
FIG. 8 is a perspective view showing a female hinge member of the camera lens module shown in FIG. 2.

FIG. 8 is a perspective view showing the female hinge member 160 of the camera lens module 100 shown in FIG. 2. As shown in FIG. 8, the female hinge member 160 consists of a second flange 163 and a cylinder 161. The second flange 163 is formed to correspond to the first flange 141 of the first cover 140, wherein the first flange 141 is provided with a projection 142 and the second flange 163 is formed with a groove 162 which is mated with the projection 142. The projection 142 and the groove 162 establish the connecting angle of the female hinge member 160 while restraining relative rotation between the rear cover 140 and the female hinge member 160. The inner side 167 of the cylinder 161 takes a form which is complementary to the male hinge member 145 of the rear cover 161, thus further reinforcing rotational restraint force. Therefore, the rear cover 140 and the female hinge member 160 can be rotated in unison. In addition, the female hinge member 160 is formed with a slit 165 which corresponds to the slit 143 of the rear cover 140, and the slit 165 provides a passage for drawing out the flexible printed circuit 133 of the camera unit 130.

The female hinge member 160 may be formed from plastic in order to reduce frictional force.

Furthermore, an elastic means 150 is provided between the first flange 141 and the second flange 163 (see FIG. 2). The illustrated elastic means 150 is a leaf spring in the form of crimped washer, which is cut in a shape corresponding to that of the slits 143 and 165, which are formed in the rear cover 140 and the female hinge member 160, respectively. Alternatively, the elastic means 150 may be formed by adhering a rubber washer 250 on the first flange 141 of the rear cover 140 (not shown).

The elastic means 150 will provide elastic force for the female hinge member 160 in the longitudinal direction of the female hinge member 160. This allows the camera lens module 100 to stably rotate without shaking because the elastic force causes a tip end of the female hinge member 160 to be in close contact with an internal wall of the closed end 304 of the module receiving portion 300 of the main body once the camera lens module 100 is assembled to the module receiving portion 300. That is, the camera lens module 100 can be prevented from experiencing undesired rotation due to its own shaking or the self-tension of the flexible printed circuit 133.

Figure 9:
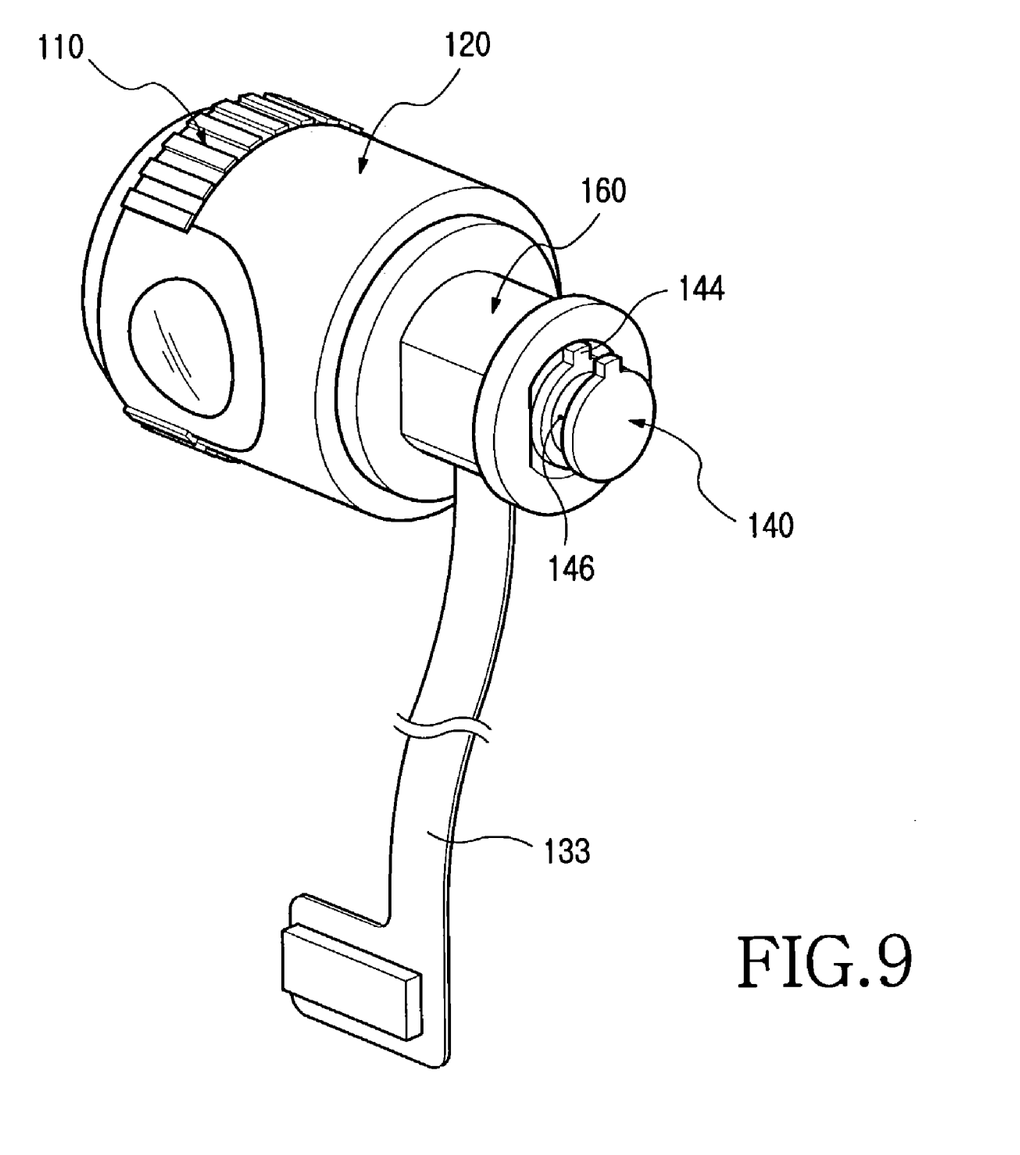
FIG. 9 is a perspective view showing the camera lens module shown in FIG. 2.

FIG. 9 is a perspective view showing the camera lens module 100 shown in FIG. 2. As shown in FIG. 9, the tip end of the male hinge member 145 protrudes out of the cylinder 161 of the female hinge member 160. That is, the projection 144 and the connecting groove 146 of the male hinge member 145 is exposed outward from the cylinder 161 of the female hinge member 160. As previously described, the projection 144 rotates within the through-hole 306 of the module receiving portion 300 and its rotating range is limited by the stopper 308 provided in the through-hole. The connecting groove 146 is exposed outward from the module receiving portion 300, so that the E-ring 173 can be fitted into the connecting groove 146.

Meanwhile, the flexible printed circuit 133 laterally extended from the cylinder 161 will be wound 720°, i.e. two turns around the cylinder 161, in consideration of the rotation of the camera lens module 100. This allows for reliable connection between the flexible printed circuit 133 and the main board (not shown) while providing a length of the flexible printed circuit 133 for the rotation of the camera lens module 100.

Figure 10:
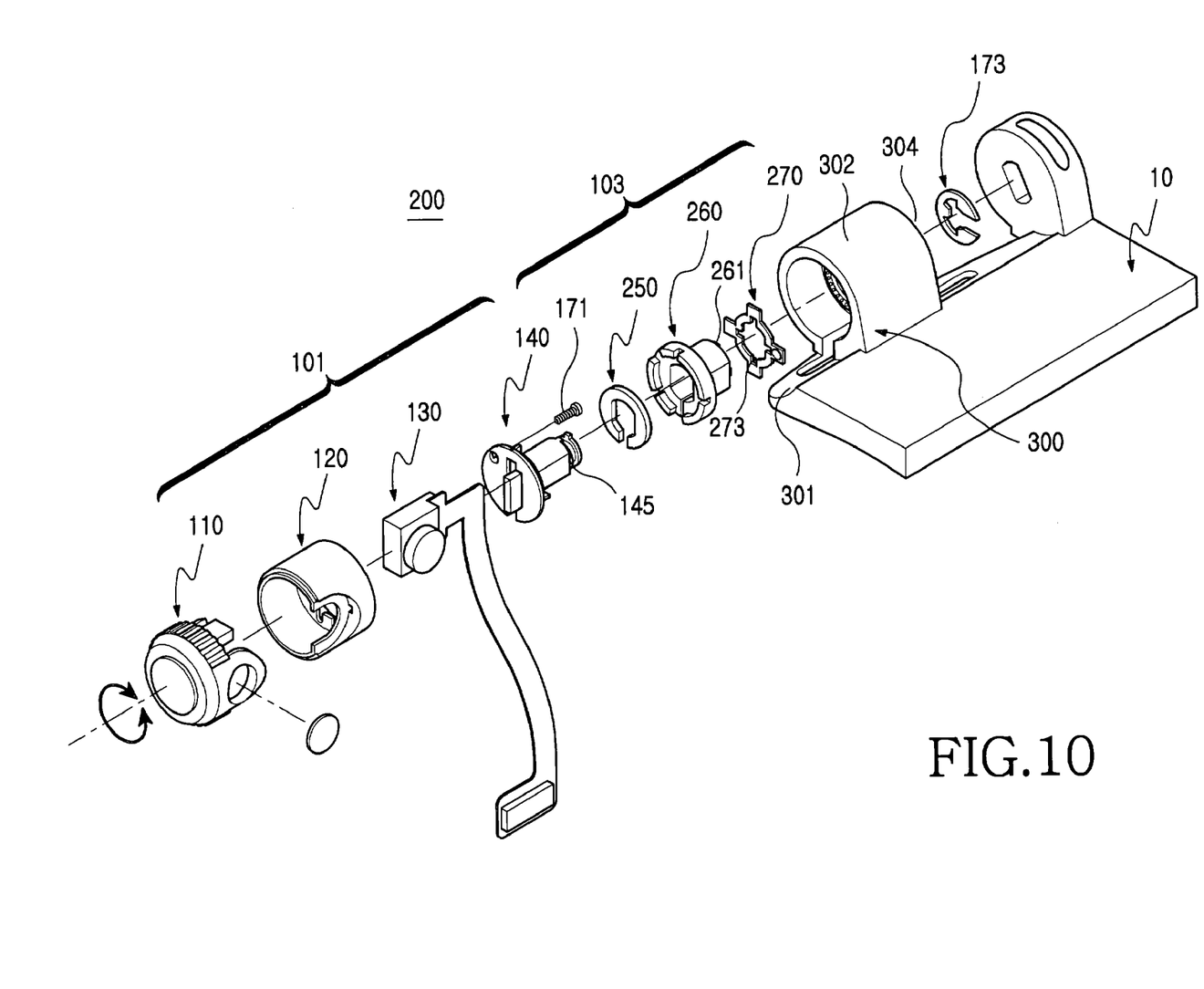
FIG. 10 is an exploded perspective view showing a camera lens module of a portable wireless terminal in accordance with a second preferred embodiment of the present invention.
Figure 11:
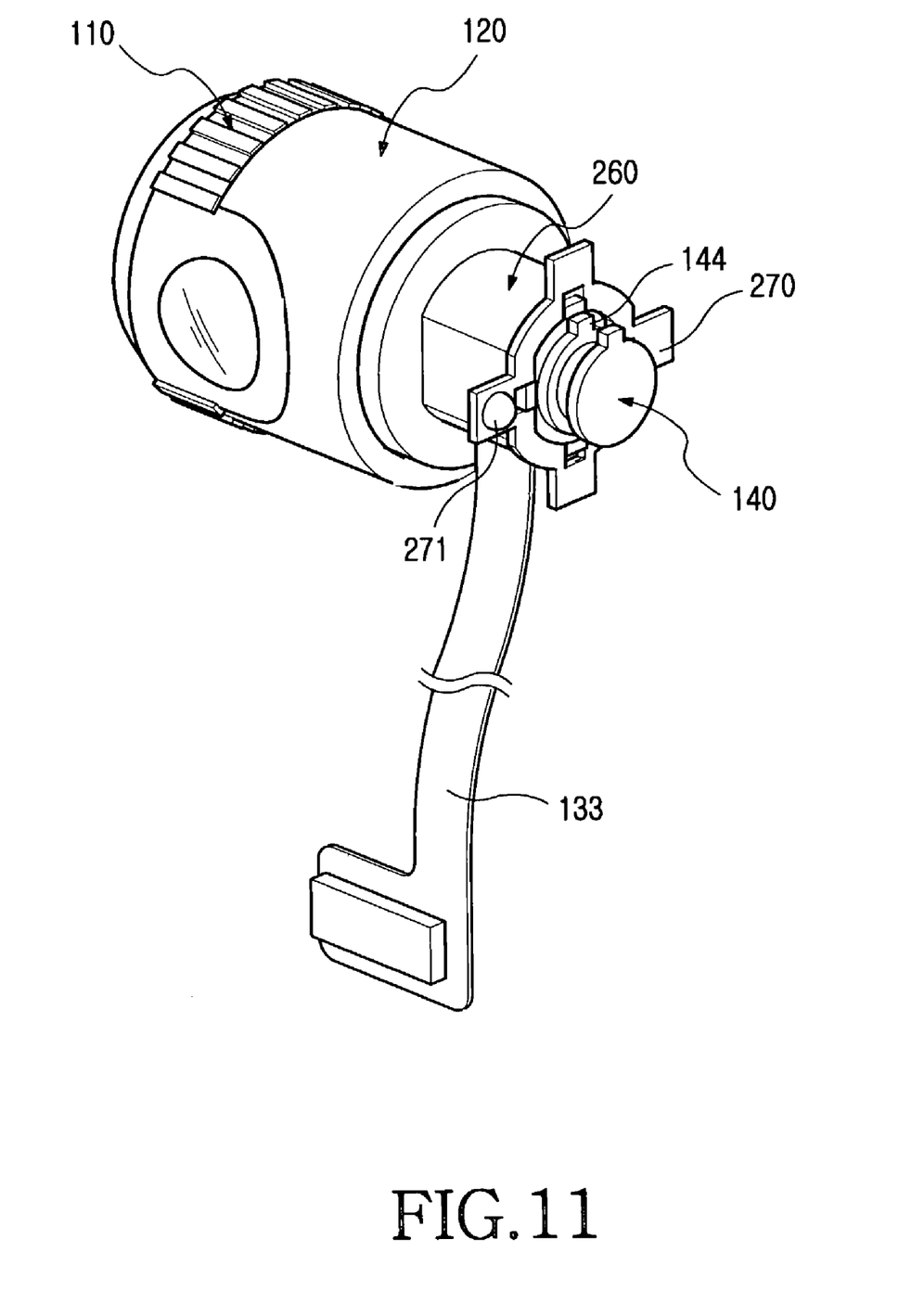
FIG. 11 is a perspective view showing a rotating frictional piece, which is fitted onto the female hinge member of the camera lens module shown in FIG. 10.

FIG. 10 is an exploded perspective view showing the camera lens module 200 for a portable wireless terminal in accordance with the second preferred embodiment of the present invention, and FIG. 11 is a perspective view showing the female hinge member 260 and a rotating frictional piece 270 of the camera lens module 200 shown in FIG. 10, in the assembled state. This embodiment is identical to the first embodiment, except that the rotating frictional piece 270 is additionally provided. Therefore, like components are indicated by like reference numerals.

The rotating frictional piece 270 is a component for allowing the user to feel the rotation of the camera lens module 200 by tactile sense. The rotating frictional piece 270 is formed in a shape of plate, in which a frictional projection 271 is formed on a diametrically extended rib; the rotating frictional piece 270 is fitted onto the tip end of the female hinge member 260. Because the tip end of the male hinge member 145 protrudes through the tip end of the female hinge member 260 (as shown in FIG. 10), the rotating frictional piece 270 is also provided with a hole for allowing the male hinge member 145 to protrude through the hole. In addition, for connection between the female hinge member 260 and the rotating frictional piece 270, the tip end of the female hinge member 260 is provided with at least two connecting projections 261 and the rotating frictional piece 270 is provided with connecting grooves 273 around the hole formed in the rotating frictional piece 270; the connecting grooves are spaced to correspond to the connecting projections 261 of the female hinge member 260.

Furthermore, as shown in FIG. 12, the through-hole 306 formed in the closed end 304 of the module receiving portion 300 is provided with stopper 308 which limits the rotational range of the projection 144 formed in the tip end of the male hinge member 145. The stopper 308 is constructed to allow the male hinge member to rotate in the range of approximately 260° to 270°. That is, the camera lens module 200 is constructed to be rotatable beyond 180°. Therefore, the user can perform image communication using the camera lens module 200. It is also possible to visually confirm the view through the display 21 of the terminal when photographing an object. These effects can also be applied to the first preferred embodiment of the present invention, as previously described.

Furthermore, the internal wall of the closed end 304 is provided with a plurality of grooves 309 along a rotational track of the frictional projection 271, so that they are to be engaged with the frictional projection 270. As a result, when the camera lens module 200 rotates, vibration produced by the frictional projection 271 and the grooves 309 is transferred to the tactile sense of the user.

Figure 13:
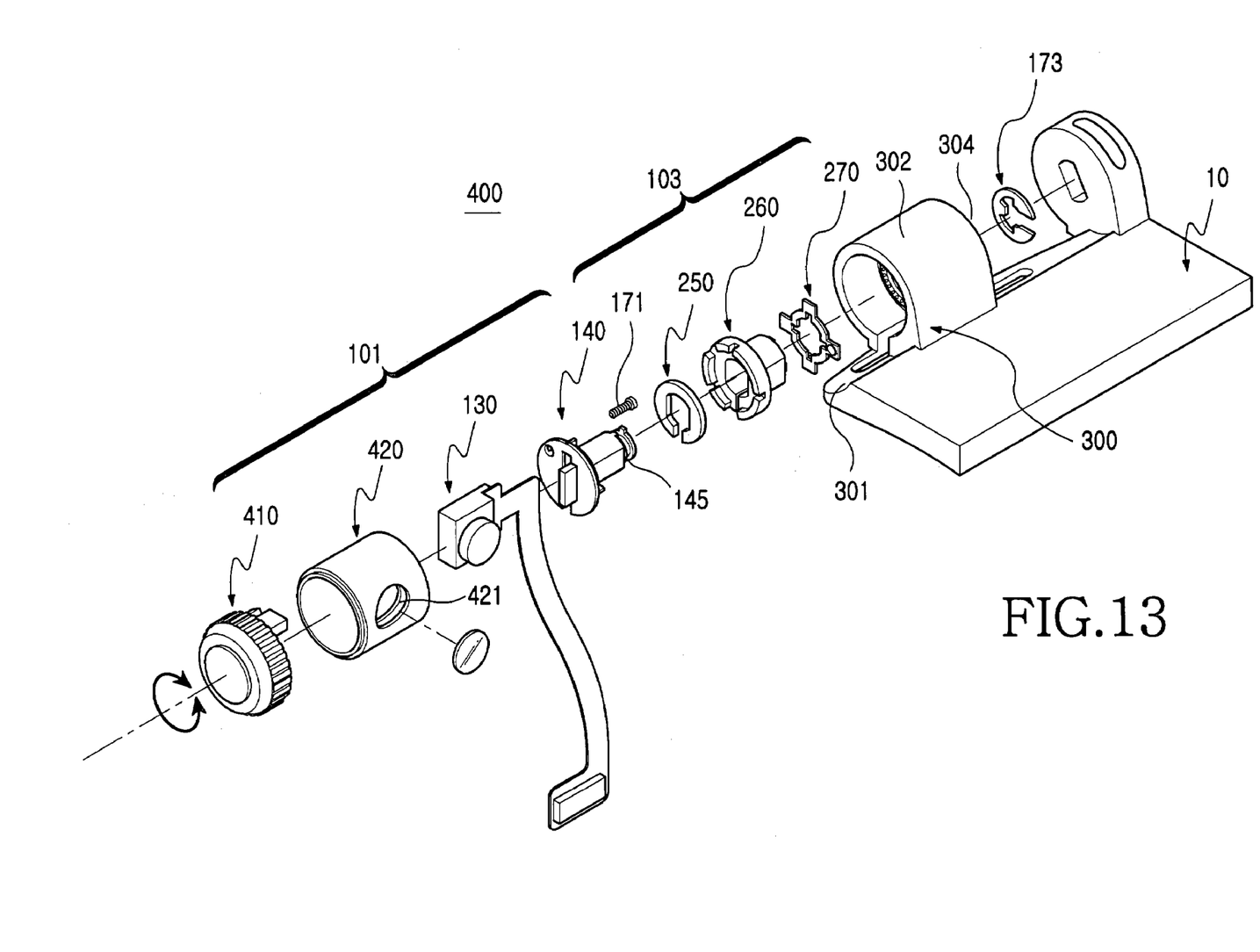
FIG. 13 is an exploded perspective view showing a camera lens module of a portable wireless terminal in accordance with a third preferred embodiment of the present invention.

FIG. 13 is an exploded perspective view showing camera lens module 400 for a portable wireless terminal in accordance with a third preferred embodiment of the present invention having an opening portion 421 formed on housing 420 for exposure of the camera lens 130. This third embodiment is similar to the second embodiment, with like components indicated with like reference numerals.

As described in the above, the camera modules in accordance with the various embodiments of the present invention are readily mounted on the hinged part of a portable wireless terminal. And if they are applied in the hinged part between the main body and the folder of a folder type terminal, it is easy to rotate the camera lens module, and thus enhance the convenience of using the terminal.

According to the camera lens module in accordance with the present invention, it becomes possible to take photographs from various angles without largely varying the position or angle of the terminal, because the camera lens module is constructed to be rotatable in relation to the terminal without any inconvenience, without the user being required to additionally separate or connect the camera lens module. In addition, it becomes easy to secure a space for mounting the camera lens module, because the camera module is mounted using the hinged part of the terminal.

One of skill in the art will be recognize that the disclosed invention is not limited to use with bar, folder or flip type terminals, and that the disclosed invention is also applicable to the other terminals capable of inter-user image communication between terminals, including PDAs and notebook computers.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A camera lens module for a portable wireless terminal including a main body and a folder, and the main body, the folder, and the camera lens module are rotatable about a same hinge axis, the camera lens module comprising:
    a camera unit consisting of a camera lens and a flexible printed circuit which provides an electrical connection for the camera lens;
    a protective transparent lens window;
    a front cover comprising an opening portion for exposure of the camera lens and a lens containing recess within which the camera lens is received;
    a housing, one end of which is connected with the front cover and which is provided with a partition in a predetermined internal position, wherein a through-hole is formed in the partition to expose the lens containing recess and to provide a passage for allowing the flexible printed circuit of the camera unit to be passed;
    a rear cover comprising a first flange which is connected to an other end of the housing and closes the through-hole of the housing, and a male hinge member which extends from the first flange;
    a female hinge member comprising a cylinder which receives the male hinge member of the rear cover, and a second flange extended from one side of the cylinder; and
    an elastic means which is mounted between the first flange and the second flange for providing elastic force in a longitudinal direction of the female hinge member.

2. The camera lens module in accordance with claim 1, the front cover further comprising one or more ribs which form the lens containing recess within which the camera lens is contained.

3. The camera lens module in accordance with claim 2, wherein the ribs of the front cover form the lens containing recess for supporting bottom and opposite lateral sides of the camera lens, wherein the opening portion for exposure of the camera lens comprises a lens cover extended to cover the camera lens and an opening formed in the lens cover; and wherein the opening is closed by a transparent window for protecting the camera lens.

4. The camera lens module in accordance with claim 2, further comprising:
    one or more screw holes formed in the longitudinal direction in the ribs of the front cover;
    one or more connecting holes formed in the partition of the housing to correspond to the screw holes; and
    one or more through-holes formed in the first flange to correspond to the screw holes and the connecting holes, wherein the front cover, the housing and the rear cover are connected with each other by fitting one or more screws from the through-holes of the first flange through the connecting holes and into the screw holes.

5. The camera lens module in accordance with claim 1, wherein a slit is formed in the longitudinal direction of the male hinge member from the first flange, so that the slit provides a passage for the flexible printed circuit to be laterally extended.

6. The camera lens module in accordance with claim 5, wherein the female hinge member is connected to the first flange of the rear cover, wherein a slit which corresponds to the slit of the rear cover is formed in the female hinge member to be extended in the longitudinal direction of the female hinge member from the second flange.

7. The camera lens module in accordance with claim 1, wherein a tip end of the male hinge member can protrude out of the cylinder of the female hinge member.

8. The camera lens module in accordance with claim 7, wherein the tip end of the male hinge member of the rear cover protruding out of the cylinder of the female hinge member has a diameter which is smaller than that of the male hinge member between the first flange and the tip end of the male hinge member, and the tip end of the male hinge member is provided with a connecting groove on a circumferential surface thereof, into which an E-ring is fitted, thereby providing a rotatable connecting means between the camera lens module and the portable wireless terminal.

9. The camera lens module in accordance with claim 1, wherein the housing further includes a circumferential surface formed with a recess, within which the exposure opening portion of the front cover is positioned.

10. The camera lens module in accordance with claim 1, wherein one or more flat surfaces are formed on a circumferential surface of the male hinge member of the rear cover, and an internal surface of the cylinder of the female hinge member is formed to be complementary to the flat surfaces of the male hinge member.

11. The camera lens module in accordance with claim 1, wherein the first flange of the rear cover is provided with a projection protruding in the longitudinal direction and the second flange of the female hinge member is provided with a groove corresponding to the projection of the first flange, so that relative rotation between the rear cover and the female hinge member is restrained.

12. The camera lens module in accordance with claim 1, wherein the elastic means is a leaf spring formed in a shape of crimped washer, which is connected to the male hinge member of the rear cover.

13. The camera lens module in accordance with claim 1, wherein the elastic means is formed from a rubber material and adhered on the first flange to surround the circumferential surface of the male hinge member of the rear cover.

14. A portable wireless terminal comprising a main body and a folder rotatably hinged to the main body, wherein the portable wireless terminal further comprises a camera lens module which is rotatably connected to a module receiving portion formed in a side portion of a top end of the main body, the camera lens module comprising:
  a camera unit comprising a camera lens and a flexible printed circuit providing an electrical connection for the camera lens;
  a front cover comprising an opening portion for exposing the camera lens, and a lens recess for receiving the camera lens;
  a housing having two ends, one of the two ends is connected with the front cover, the housing having a partition disposed in a predetermined position of the housing, the partition having a through-hole to expose the lens recess and to allow the flexible printed circuit to pass through;
  a protective transparent lens window;
  a rear cover comprising a first flange which is connected to an other end of the housing, and a male hinge member which extends from the first flange and provides a connecting means for allowing the camera module to be rotatably connected to the module receiving portion in the main body;
  a female hinge member comprising a cylinder which receives the male hinge member of the rear cover, and a second flange extended from one end of the cylinder and connected to the first flange of the rear cover; and
  a hinge assembly combined with an elastic means which is mounted between the first flange and the second flange for providing elastic force in the longitudinal direction of the female hinge member,
  wherein the main body, the folder, and the camera lens module are rotatable about a same hinge axis.

15. The portable wireless terminal in accordance with claim 14, wherein a tip end of the male hinge member can protrude out of the cylinder.

16. The portable wireless terminal in accordance with claim 15, wherein the module receiving portion has a closed end, through which a through-hole is formed to allow the tip end of the male hinge member of the rear cover to protrude outward, wherein the tip end of the male hinge member is formed with a groove on a circumferential surface thereof for fitting an E-ring therein, and wherein the camera lens module is connected to the module receiving portion by inserting the tip end of the male hinge member through the through-hole of the module receiving portion and then fitting the E-ring into the groove.

17. The portable wireless terminal in accordance with claim 16, further comprising:
  a projection formed on a circumferential surface of the tip end of the male hinge member; and
  a stopper protruding inward from an inner surface of the through-hole of the module receiving portion, thereby limiting a rotating range of the projection of the male hinge member.

18. The portable wireless terminal in accordance with claim 14, wherein the module receiving portion comprises:
  a lens receiving portion formed in a curved shape in a side of the top end of the main body to support a side of a circumferential surface of the housing; and
  a cylindrical hinge receiving portion which extends from an end of the lens receiving portion and receives the hinge assembly, wherein an outer circumferential surface of the cylindrical hinge receiving portion is aligned with the housing positioned in the lens receiving portion.

19. The portable wireless terminal in accordance with claim 14, wherein the hinge assembly is formed with a slit for providing a passage, through which the flexible printed circuit extended from the housing can be laterally drawn out.

20. The portable wireless terminal in accordance with claim 14, wherein a tip end of the female hinge member is provided with at least two connecting projections, wherein a rotating frictional piece, which has a frictional projection formed on a rib extended outwardly, is provided with connecting holes which correspond to the connecting projections of the female hinge member and thus fixedly connect the frictional projection to the tip end of the female hinge member, and wherein an internal wall of a closed end of the module receiving portion is formed with a plurality of grooves along a rotational track of the frictional projection, wherein the plurality of grooves are to be engaged with the frictional projection.

21. A camera lens module for a portable wireless terminal including a main body and a folder, and the main body, the folder, and the camera lens module are rotatable about a same hinge axis, the camera lens module comprising:
- a housing containing a camera lens, which is provided with a partition in a predetermined internal position, a through-hole formed in the partition, and an opening portion for exposure of the camera lens;
- a protective transparent lens window;
- a front cover coupled at one end of the housing; and
- a rear cover comprising a first flange, which is connected to an other end of the housing and closes the through-hole of the housing, and a male hinge member which extends from the first flange for rotatable connection of the camera lens module to the portable wireless terminal.

22. The camera lens module in accordance with claim 21, further comprising:
- a female hinge member comprising a cylinder which receives the male hinge member of the rear cover, and a second flange extended from one end of the cylinder and connected to the first flange of the rear cover.

23. The camera lens module in accordance with claim 21, wherein the front cover is provided with one or more ribs which form a lens containing recess within which the camera lens is contained.

* * * * *